Jan. 12, 1926.

L. B. CURTIS 1,569,316

THREAD CUTTING DIES

Filed Dec. 30, 1924     2 Sheets-Sheet 1

INVENTOR.
L. B. Curtis.
BY
ATTORNEY

Jan. 12, 1926. 1,569,316
L. B. CURTIS
THREAD CUTTING DIES
Filed Dec. 30, 1924 2 Sheets-Sheet 2

INVENTOR.
L. B. Curtis.
BY
ATTORNEY

Patented Jan. 12, 1926.

1,569,316

UNITED STATES PATENT OFFICE.

LEWIS B. CURTIS, OF BRIDGEPORT, CONNECTICUT.

THREAD-CUTTING DIES.

Application filed December 30, 1924. Serial No. 758,797.

*To all whom it may concern:*

Be it known that I, LEWIS B. CURTIS, a citizen of the United States, residing at the city of Bridgeport, in the county of Fairfield and State of Connecticut, have invented certain new and useful Improvements in Thread-Cutting Dies; and I do declare the following to be a full, clear, and exact description of the invention, such as will enable others skilled in the art to which it appertains to make and use the same.

My invention relates to thread cutting dies, but more especially has reference to that class thereof in which the cutting dies proper are made of high speed steel and are inserted and firmly held within holders made of low grade carbon steel.

One object of the invention is to so construct and equip the die shanks and the holders that the former may be inserted within or removed from the latter longitudinally or in either direction laterally, and furthermore to so secure the shanks within the holders that there can be no undue straining of the holder jaws caused by the thrust of the dies during the process of thread cutting.

Another object of the invention is to so locate the dowel and bolt fastener perforations in the die shanks and holder jaws, that it will be impossible to secure a die in the wrong holder.

In the accompanying drawing—

Figure 3:
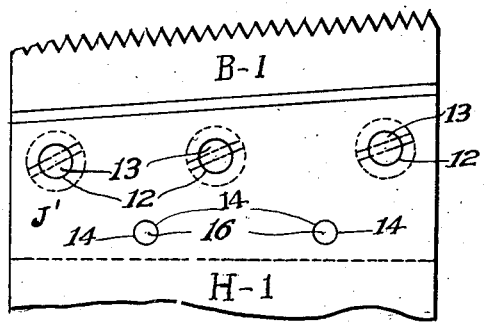
Figure 2:
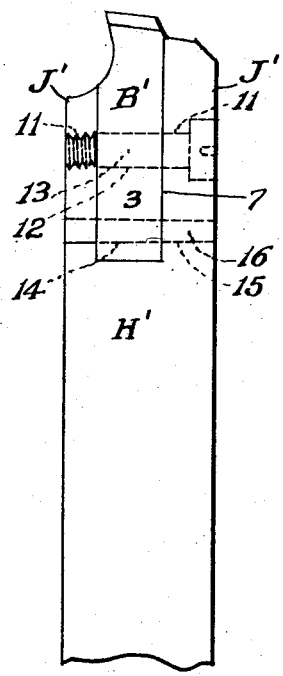
Figure 2 is a detail side elevation of a threading die in position within a holder.

Figure 3 a broken front view of the construction shown at Figure 2.

Figure 4:
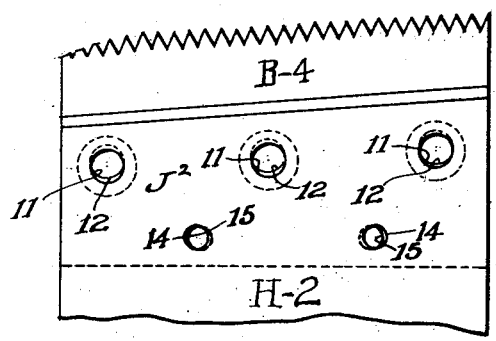
Figure 9:
Figure 10:
Figure 11:
Figure 12:
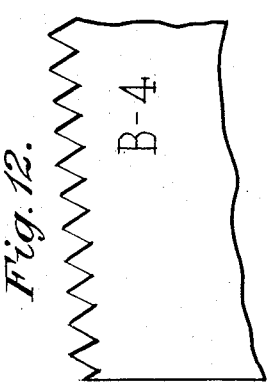
Figures 5, 6, 7, 8:
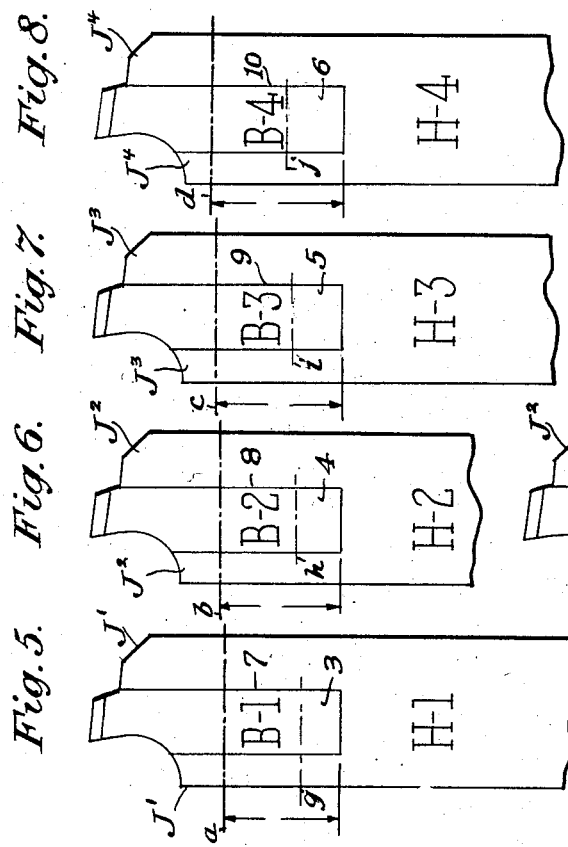

Figure 4 a view similar to Figure 3 but showing how a die cannot be secured in the wrong holder.

Figures 5, 6, 7, and 8, are side elevations of the four dies used in pipe threading, the dotted lines $a$, $b$, $c$, and $d$, showing the axial lines of the securing bolts for each die and their distance from the bottoms of the slots in the holders.

Figure 13:
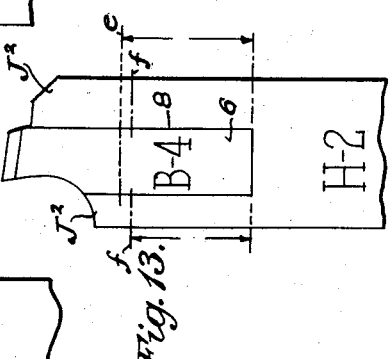

Figures 9, 10, 11 and 12, are detail broken face elevations of the four dies, showing particularly the difference in the ends of the bits that initially cut the threads, and Figure 13 is a side elevation of the structure shown at Figure 4, the dotted line $e$ indicating the axial line of the perforations in the die shank, while the line $f$ indicates the axial lines of the perforations in the holder jaws.

Similar numerals of reference denote like parts in the several figures of the drawing.

Figure 1:
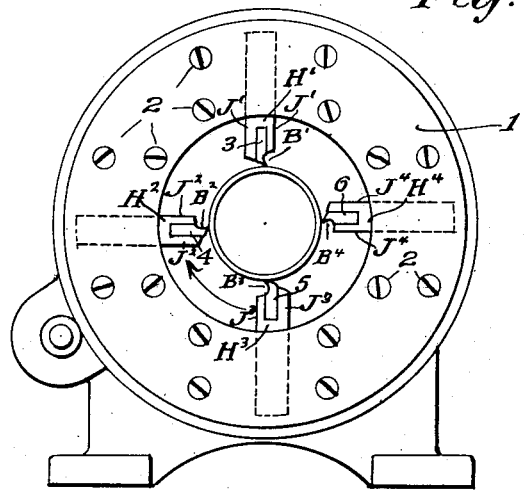
Figure 1 is a front elevation of a pipe threading machine with threading dies in position for cutting threads on a pipe.

The holders $H^1$, $H^2$, $H^3$, and $H^4$, are all made alike and are adapted to be secured within the usual die carrying ring of a pipe threading machine, so that, in the cutting positions of the dies within these holders, the appearance will be as is shown at Figure 1.

Referring to this Figure 1, the holders are secured to the die carrying ring (not shown) by a ring plate 1 which is fixed to said ring by many screws 2, and it will therefore be clear that, should it become necessary to replace a broken die, the latter cannot be removed by merely withdrawing it out through the front end of its holder, since, in order to do this, the pipe must be removed, or the holder withdrawn from the pipe. Therefore, this invention aims to so secure the die shanks within the holders, that the dies may be removed laterally from the holders by merely taking out the securing bolt and dowels, and without disturbing the pipe or any other part of the thread cutting organization, all of which will be obvious from a glance at Figure 1.

The dies $B^1$, $B^2$, $B^3$ and $B^4$, including their shanks 3, 4, 5, and 6, are all made precisely alike with the exception of the cutting bits which do the initial cutting, and also the holders are all exactly the same, and when the die shanks are assembled within holders, the inner ends of the shanks must seat firmly against the bottoms of the slots 7, 8, 9, 10, that are cut in the ends of the holders and form the retaining jaws $J^1$ $J^1$, $J^2$ $J^2$, $J^3$ $J^3$, and $J^4$ $J^4$.

The die shanks fit snugly between these jaws and are laterally flush with the sides of the jaws.

Perforations are formed through both the jaws and the shanks, and are indicated by the numerals 11 and 12 respectively, and bolts 13 are inserted through these perforations, the heads of such bolts being countersunk within one of the jaws as clearly indicated at Figure 2, while the ends of the bolts are screwed within the other jaw as likewise indicated at Figure 2, so that it will be clear that both jaws will be tightly drawn against the shanks owing to the slight resiliency in the jaws themselves.

It frequently happens that a thread is entirely spoiled because of the improper sequence of the dies in their location within a pipe threading machine, and, for several reasons, it is apparently well nigh impossible to prevent this.

But the present invention renders it absolutely necessary that the right die should be in the right holder before the securing bolts can be applied, as will now be explained.

The perforations 11 and 12 in the jaws and die shanks are perfectly alined to accommodate the bolts 13, but it is evident that if this were not the case, the bolts could not be inserted.

I have therefore formed these perforations in different locations for each of the four sets of dies and holders, as is indicated at Figures 5, 6, 7, and 8, where the axial lines of such perforations is indicated by the lines $a$, $b$, $c$, and $d$.

Furthermore, the perforations 14, 15, in the jaws and shanks for the dowels 16 should properly be in alinement, as shown in the instance of one assembled die and holder at Figure 2, but I have likewise formed these perforations in different locations for each of the four sets of dies and holders, the axial lines of which locations are indicated in Figures 5, 6, 7, and 8, by the lines $g$, $h$, $i$ and $j$, respectively.

Therefore it will be manifest that if a die were placed in the improper holder the situation would be as is indicated at Figure 4, where a $B^4$ die has been placed within an $H^2$ holder, it being clear from this illustration that the perforations do not aline and that neither the securing bolts nor the dowels can be inserted. In such an instance the machinist knows, even without the aid of his eyesight, that the elements are improperly assembled, and, in this connection, it might be well to state that the proper die can be assembled within the proper holder without any reference whatever to the numbers on such parts.

As a matter of fact the dies are numbered 1, 2, 3, and 4, and the holders are numbered likewise. But numbers get defaced, sometimes the dies or holders are wrongly designated numerically and there are instances where the numbers are carelessly omitted, all of which defects frequently entail considerable loss both of time and material, but can cut no figure whatsoever when the present invention is utilized.

By a glance at Figures 9, 10, 11, and 12, the loss occasioned by an improper sequential location of the cutting dies will be clearly appreciated. Figures 3 and 4 show in contrast a proper and an improper assembly of the dies and holders, and Figure 2 shows that the jaws engaged by the threaded end of the bolt fully capable of withstanding the severe thrust caused by the thread cutting operations, while at the same time this jaw can be removed laterally from the holder which is a great saving of time.

Having thus described my invention what I claim as new is:—

1. A set of holders and pipe threading dies, comprising holders for each die, each holder being slotted at the end to provide jaws, the shanks of the dies being seated firmly against the bottoms of said slots, each individual holder and die having differently located alined perforations, and bolt and dowel devices passed through said perforations to secure the holder and die together.

2. A set of dies and die holders for use in pipe threading machines, each individual member of said set comprising a holder having integral open jaws at its outer end and a die having a shank that is seated against said holder within said jaws and is flush with the sides thereof, bolts whose heads are countersunk within one jaw of each of said members which bolts pass through perforations in the jaws and shank of each member, the free ends of the bolts being threadedly engaged within the other jaw of each member, and dowels passed through perforations in the jaws and shank of each member, said perforations being differently located in each member.

3. A set of dies and die holders for use in pipe threading machines, said set comprising four similar die holders having integral open jaws at their outer ends, and four threading dies whose initial cutting bits are differently formed, each die having a shank which is firmly seated within the jaws of its holder and is laterally removed therefrom, differently located perforations through the jaws and shanks of each member of said set, and securing bolts and dowels passed through said perforations.

In testimony whereof I affix my signature hereto.

LEWIS B. CURTIS.